United States Patent
Tsirkin et al.

(10) Patent No.: US 9,858,109 B2
(45) Date of Patent: Jan. 2, 2018

(54) MODULE MANAGEMENT IN A PROTECTED KERNEL ENVIRONMENT

(71) Applicant: Red Hat Israel, Ltd., Raanana (IL)

(72) Inventors: Michael Tsirkin, Raanana (IL); Paolo Bonzini, Milan (IT)

(73) Assignee: RED HAT ISRAEL, LTD., Raanana (IL)

(*) Notice: Subject to any disclaimer, the term of this patent is extended or adjusted under 35 U.S.C. 154(b) by 124 days.

(21) Appl. No.: 15/054,209

(22) Filed: Feb. 26, 2016

(65) Prior Publication Data

US 2017/0249174 A1 Aug. 31, 2017

(51) Int. Cl.
G06F 9/455 (2006.01)
G06F 21/12 (2013.01)
G06F 21/71 (2013.01)

(52) U.S. Cl.
CPC ........ G06F 9/45558 (2013.01); G06F 21/126 (2013.01); G06F 21/71 (2013.01); G06F 2009/45587 (2013.01)

(58) Field of Classification Search
CPC .... G06F 9/45558; G06F 21/126; G06F 21/71; G06F 2009/45587
See application file for complete search history.

(56) References Cited

U.S. PATENT DOCUMENTS

| | | | |
|---|---|---|---|
| 7,272,712 B1 | 9/2007 | Gryck et al. | |
| 7,757,218 B2* | 7/2010 | Aroya | G06F 11/3688 717/130 |
| 7,845,009 B2 | 11/2010 | Grobman | |
| 8,239,838 B2* | 8/2012 | Yim | G06F 11/3644 717/124 |
| 8,661,417 B2* | 2/2014 | Panchamukhi | G06F 11/362 717/126 |
| 9,098,626 B2* | 8/2015 | Gajula | G06F 11/3476 |
| 9,128,786 B2 | 9/2015 | Dong et al. | |
| 9,195,487 B2 | 11/2015 | Adams | |
| 2008/0016339 A1 | 1/2008 | Shukla | |
| 2013/0152095 A1 | 6/2013 | McKenney | |
| 2014/0115652 A1 | 4/2014 | Kapoor et al. | |

(Continued)

OTHER PUBLICATIONS

Abhinav Srivastava et al. "Efficient Protection of Kernel Data Structures via Object Partitioning" https://www.acsac.org/2012/openconf/modules/request.php?module=oc_program&action=view.php&a=&id=155&type=4, AT&T Labs—Research; HP Fortify, Dec. 3-7, 2012, 10 pages.

(Continued)

Primary Examiner — Beemnet Dada
(74) Attorney, Agent, or Firm — Haynes & Boone LLP (57) ABSTRACT

Methods, systems, and computer program products are included for performing module unloading in a protected kernel environment. A method includes loading a module into a kernel, the module including an exit function. The kernel provides, to a hypervisor, a memory location corresponding to the exit function of the module. A kernel protection feature is activated. After activating the kernel protection feature, the hypervisor detects an attempt to execute the exit function. The hypervisor determines that the attempt to execute the exit function corresponds to the memory location provided to the hypervisor. Based on the determining, the hypervisor allows execution of the exit function.

20 Claims, 4 Drawing Sheets

(56) References Cited

U.S. PATENT DOCUMENTS

2016/0224362 A1* 8/2016 Tsirkin ................ G06F 9/45558

OTHER PUBLICATIONS

Abhinav Srivastava et al. "Kernel Data Integrity Protection via Memory Access Control" https://smartech.gatech.edu/bitstream/handle/1853/30785/GT-CS-09-04.pdf, School of Computer Science, Georgia Institute of Technology, accessed Dec. 11, 2015, 20 pages.
Arvind Seshadri et al., "SecVisor: A Tiny Hypervisor to Provide Lifetime Kernel Code Integrity for Commodity OSes" https://www.cs.cmu.edu/~arvinds/pubs/secvisor.pdf, CyLab/CMU, Pittsburgh, PA, USA, Oct. 14-17, 2007, 17 pages.

* cited by examiner

MODULE MANAGEMENT IN A PROTECTED KERNEL ENVIRONMENT

FIELD OF DISCLOSURE

The present disclosure generally relates to memory, and more particularly to systems and methods for loading and unloading modules in memory.

BACKGROUND

Conventional technologies that are provided at the kernel level include kernel protection mechanisms. Kernel protection mechanisms allow enforcement of kernel protection measures that prevent portions of the kernel from being executed and/or modified. These mechanisms are useful for thwarting at least some malware and helping to safeguard the integrity of the kernel.

One issue that has arisen is that these kernel protection mechanisms are not compatible with other technologies that require write and/or execute access to the kernel. That is, the kernel protection mechanisms may render other technologies inoperable. For example, the kernel protection mechanisms may prevent device drivers and other modules from being loaded into the kernel. Further, the kernel protection mechanisms prevent modules from being unloaded from memory. For example, module unloading instructions are unable to be executed and the memory occupied by the modules is unable to be re-allocated for other uses. These issues result in the kernel protection mechanisms being impractical for use in production environments.

Accordingly, while kernel protection mechanisms may be helpful in some ways, they may also counter useful features that allow users to perform beneficial activities such as loading and unloading of kernel modules. It would be advantageous to allow kernel modules to be loaded and unloaded, while at the same time allowing kernel protection mechanisms to be implemented. The techniques provided herein offer module loading and unloading in a protected kernel environment.

BRIEF SUMMARY

According to an example, a method includes loading a module into a kernel, the module including an exit function; providing, to a hypervisor, a memory location corresponding to the exit function of the module; activating a kernel protection feature that prevents the kernel from executing at least one instruction included in the exit function; after activating the kernel protection feature, detecting an attempt to execute the at least one instruction included in the exit function; determining, by the hypervisor, that the attempt to execute the exit function corresponds to the memory location provided to the hypervisor; and based on the determining, allowing execution of the at least one instruction included in the exit function.

According to an example, a non-transitory machine-readable medium includes machine-readable instructions executable to cause a machine to perform operations comprising: loading a module into a kernel, the module including an exit function; providing, to a hypervisor, a memory location corresponding to the exit function of the module; activating a kernel protection feature that prevents the kernel from executing at least one instruction included in the exit function; after activating the kernel protection feature, detecting an attempt to execute the at least one instruction included in the exit function; determining, by the hypervisor, that the attempt to execute the exit function corresponds to the memory location provided to the hypervisor; and based on the determining, allowing execution of the at least one instruction included in the exit function.

According to an example, a system includes a kernel that is provided by a hypervisor; a module that is loaded by the kernel, the module including an exit function; a kernel protection feature that is activated by the kernel, the kernel protection feature to prevent the kernel from executing at least one instruction included in the exit function; and one or more processors that execute the hypervisor to: detect an attempt to execute the at least one instruction included in the exit function; and allow execution of the at least one instruction included in the exit function.

Embodiments of the present disclosure and their advantages are best understood by referring to the detailed description that follows.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
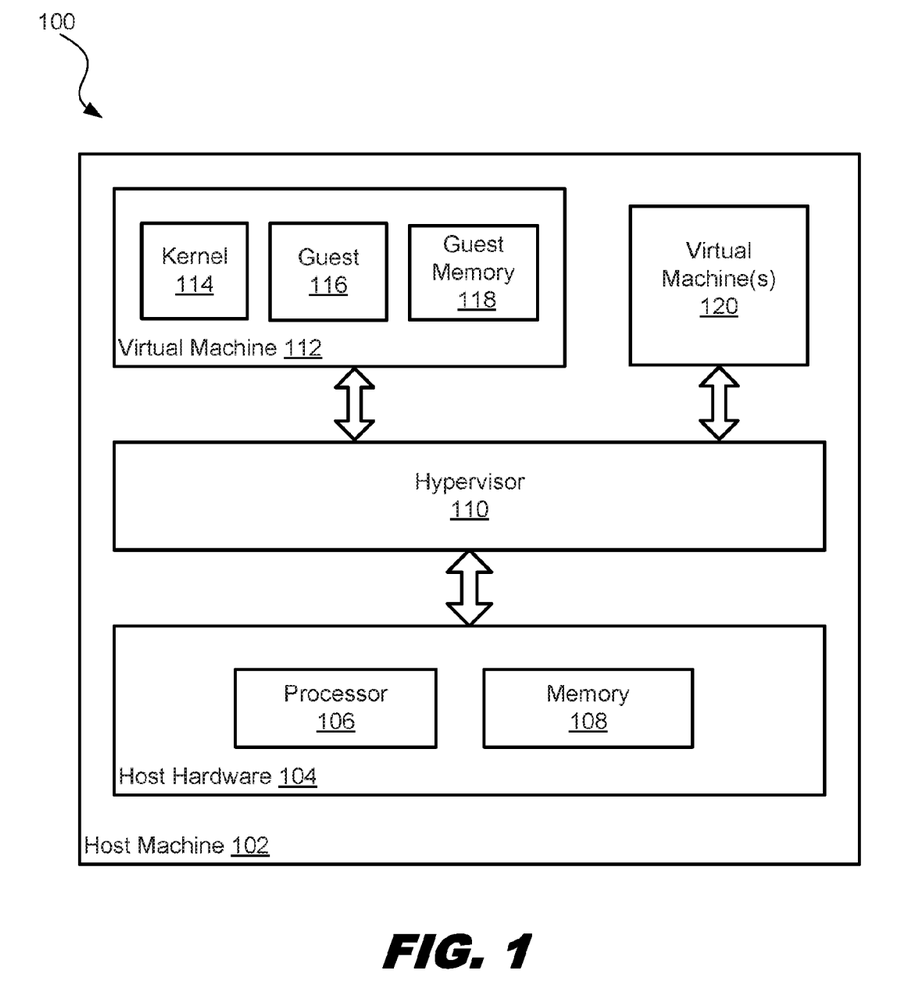
FIG. 1 is an organizational diagram illustrating a system that provides a protected kernel environment, in accordance with various examples of the present disclosure.

FIG. 1 is an organizational diagram illustrating a system that provides a protected kernel environment, in which various aspects of the present disclosure may be implemented.

The system 100 includes a host machine 102. The host machine 102 includes host hardware 104. Host hardware 104 includes physical elements such as a processor 106, memory 108, and may also include other input/output (I/O) devices, such as those illustrated in FIG. 4.

The host machine 102 includes a hypervisor 110, which also may be referred to as a virtual machine monitor. Hypervisor 110 may include executable instructions that are stored in the memory 108 and executed by the processor 106. In some examples, the hypervisor 110 is run on top of a host operating system. In other examples, the hypervisor 110 is run directly on host hardware 104 without the use of a host operating system.

In the present example, hypervisor 110 provides one or more virtual machines, such as the virtual machine 112 and virtual machine(s) 120. In other examples, there may be any number of virtual machines. Each virtual machine is an underlying virtualization of host machine 102. Each virtual machine may be, for example, a hardware emulation, full virtualization, para-virtualization, and operating system-level virtualization virtual machine.

The hypervisor 110 manages system resources, including access of virtual machines (e.g., virtual machine 112 and virtual machine(s) 120) to the host hardware 104, such as processor 106, memory 108, and other hardware devices. In some examples, the system resources that may be provided to each virtual machine include a virtual CPU that is mapped to the processor 106, guest memory that is mapped to a portion of the memory 108, one or more virtual devices that are mapped to other host hardware 104, such as a network device, an emulated NIC or disk, virtual firmware, and so forth.

In the present example, a kernel 114 runs on the virtual machine 112 provided by the hypervisor 110. The kernel 114 provides core computing functionality to the virtual machine 112. For example, kernel 114 is structured to manage important tasks, such as allocating guest memory 118, sending and receiving I/O, managing a file system provided to the guest 116, handling interrupts, scheduling and running processes to execute instructions of computing tasks, providing an interface between devices and software applications, and/or providing other fundamental computing features.

In some examples, the virtual machine 112 is structured to include the kernel 114 as stand-alone kernel. However, in the present example, the virtual machine 112 is structured with the kernel 114 as well as a guest 116 that is built on top of the kernel 114 and relies upon the kernel 114 for allocating portions of the guest memory 118 to the guest 116 (and its applications) and executing instructions of the guest 116 (and its applications). The guest 116 may also be referred to as a guest operating system. Examples of guests include, for example, LINUX, UNIX, DOS, OS/2, IOS, ANDROID, WINDOWS, and so forth. These guests all include, at their core, a kernel (such as kernel 114) that handles allocation of memory and runs processes to execute instructions. The guest 116 may include features such as user interfaces (such as desktop and/or command line interfaces), file systems, server applications, database management systems, and various other user applications that may be pre-installed on the guest 116 or added after installation of the guest 116.

Each virtual machine 120 may be similarly structured with a guest operating system that includes a kernel, and virtual memory that may be allocated by the kernel to the kernel itself, the guest operation system, and/or other applications.

The guest 116 running on a virtual machine 112 may include a same or a different operating system as a host operating system running on the host machine 102. For example, the guest 116 may provide an operating system that is accessed locally on the host machine 102 as a default operating environment of the host machine 102. In other examples, the host machine 102 is structured with an operating system that is separate from the guest 116, and the guest 116 is provided in addition to the host machine's operating system. Accordingly, the host machine 102 may run multiple operating systems concurrently and in isolation from other operating systems. Moreover, the guest operating systems of the host machine 102, virtual machine 112 and virtual machine(s) 112 may be homogenous or heterogeneous. That is, the guest operating systems may all be one type (e.g., LINUX) or may be different types (e.g., guest 116 may be RED HAT ENTERPRISE LINUX, and a virtual machine of the virtual machine(s) may include a guest that is provided by a non-LINUX vendor).

The hypervisor 110 provides a guest memory 118 that is allocated to the kernel 114, guest 116, and/or other applications running on the virtual machine 112. In the present example, the guest memory 118 is structured as a virtualized portion of the memory 108. The guest memory 118 may include one or more guest memory pages that are mapped to memory pages of the memory 108 via one or more mappings, such as page tables. The mapping(s) may be provided by the hypervisor 110. As an example, page tables may include Extended Page Tables (EPT). Accordingly, the hypervisor 110 is structured with access to the guest memory 118 to virtualize the memory 108 and provide the guest memory 118 to the virtual machine 112. The guest memory 118, once allocated to the virtual machine 112 by the hypervisor 110, may have portions allocated by the kernel 114 to the kernel 114 itself, the guest 116, and/or other applications run on the virtual machine 112 by the kernel 114.

Further, the hypervisor 110 may also virtualize other areas of memory 108 for the virtual machines(s) 120 that are not mapped to the guest memory 116. These other areas of memory may therefore be inaccessible to the kernel 114 and/or guest 116. For example, the hypervisor 110 may also be structured to provide other guest memories to each of the virtual machine(s) 120 that are isolated from other guest memories. Accordingly, the hypervisor 110 is structured with access to the memory 108 to allocate and provide guest memory (e.g., guest memory 118 and/or other guest memories provided to the virtual machine(s) 120).

The guest memory 118 and/or memory 108 may be structured to implement various access permissions (e.g., read access, write access, and/or execute access) via one or more flags or other data structures that are maintained corresponding to the memory pages and/or page mappings. The kernel 114 may modify the access permissions to allow or prohibit particular access types (e.g., read, write, and/or execute access) to particular memory locations by particular applications. For example, the kernel 114 may be structured with write and/or execute access to portions of the guest memory 118 that are allocated to the kernel 114, for which the guest 116 does not have write and/or execute access.

In the present example, the kernel 114 is structured to operate in a protected kernel environment, which may prevent read, write, and/or execute access to portions of the kernel 114. For example, the kernel 114 may be structured to include KERNEL GUARD TECHNOLOGY (KGT), which protects memory pages and/or page entries corresponding to the kernel 114 from being written to and/or executed. In some examples, the protected kernel environment, when activated, sets access permissions for portions of the kernel 114 and/or locks the access permissions to prevent the access permissions from being modified.

In some examples, the activation of the protected kernel environment is triggered by the kernel 114 executing a hypercall to request that the hypervisor 110 activate the protected kernel environment. To lock the access permissions, the hypervisor 110 and/or kernel 114 may include one or more data structures that may be modified by the hypervisor 110 to indicate the locked or unlocked status of the access permissions. For example, once unlocked, access permissions for reading, writing, and/or executing portions of the kernel 114 may be modified to enable particular access types. When locked, the access permissions may be restricted from modification, such that particular access types are prevented.

In the present example, the hypervisor 110 is structured with access to the guest memory 118, including page table entries and memory pages allocated to the kernel 114. The hypervisor 110 is structured to maintain this access even while the protected kernel environment is implemented. The hypervisor 110 is structured to communicate with the kernel 114, such as via hypercalls, system calls, shared memory, and/or interrupts, such that information may be passed between the hypervisor 110 and the kernel 114.

Figure 2:
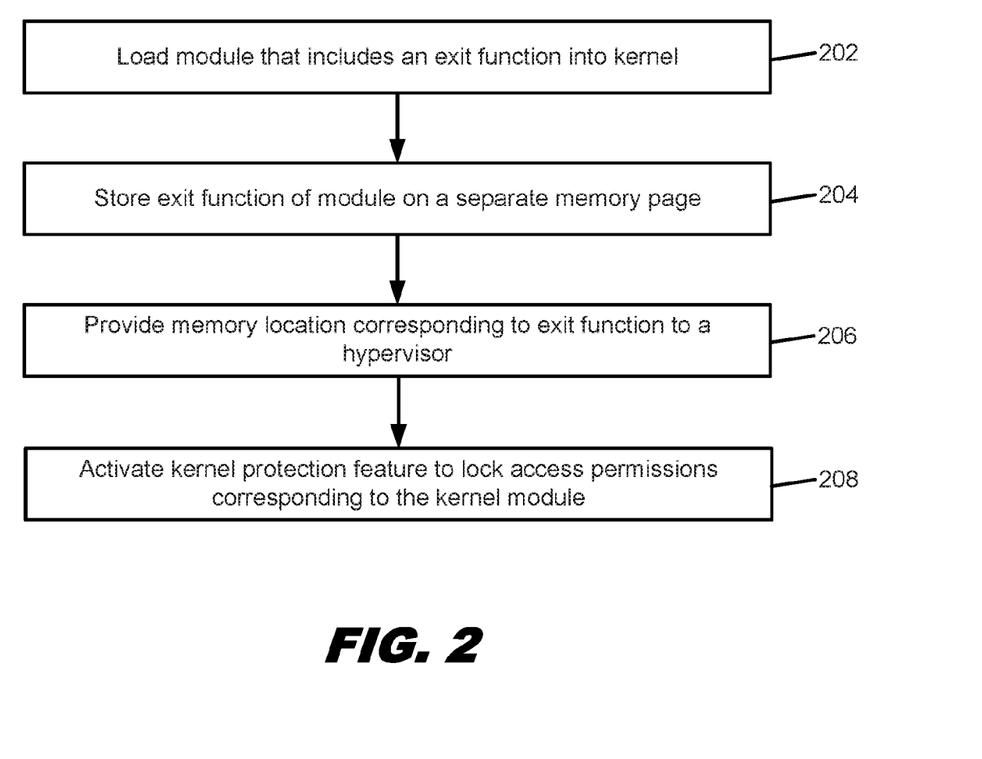
FIG. 2 is a flow diagram illustrating loading of a kernel module in a protected kernel environment, in accordance with various examples of the present disclosure.

FIG. 2 is a flow diagram illustrating a method for loading a kernel module in a protected kernel environment, according to some examples of the present disclosure. The method may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method is performed by the system 100 illustrated in FIG. 1. For example, the method may be performed on the host machine 102. In some examples, the order of the actions described below may also be performed according to alternative orderings. In yet other examples, additional actions may be added and actions that are described may be removed.

At action 202, a module is loaded into a kernel. In some examples, the module is a device driver. In other examples, the module provides support for a networking protocol. The loading of the module may include storing one or more instructions corresponding to the module into memory that is allocated to the kernel. In some examples, the module loading also includes adding one or more references to the module into portions of the kernel. For example, interrupt vectors and/or other data structures that are part of the kernel may be updated to include references (such as pointers) to functions that are included in the module.

In the present example, the module may be loaded into the kernel prior to activating a kernel protection feature, such that the kernel is able to allocate memory for the module and write one or more instructions corresponding to the module into the memory.

At action 204, as part of the module loading, an exit function corresponding to the module is loaded. In the present example, the kernel stores the exit function of the module on a memory page that is separate from the remaining module portions. For example, the exit function may be stored on a memory page by itself, without any other non-exit function instructions being included on the memory page. The instructions corresponding to the exit function may be stored starting at the start of the memory page (offset 0) or starting at other offsets within the memory page.

In the present example, the exit function includes one or more instructions that are configured to perform clean-up activities corresponding to the unloading of the module. For example, prior to unloading the module from memory, the references to the module in the kernel should be removed, so that the kernel does not attempt to access the module after it has been unloaded. Accordingly, the exit function may access data structures of the kernel, such as the interrupt vectors to remove references (such as pointers) to the module.

In the present example, the exit function includes an entry point, which is an instruction of the exit function that is to be executed to initiate the performing of the clean-up activities corresponding to the module.

At action 206, the memory location corresponding to the exit function is provided, by the kernel, to the hypervisor. The kernel and hypervisor may communicate, for example, via hypercalls, system calls, shared memory, and/or interrupts.

Prior to providing the memory location to the hypervisor, the kernel may store the memory location corresponding to the exit function. The memory location may include one or more memory addresses. In some examples, the memory location is stored to a data structure, such as a list, with one or more other memory locations corresponding to other kernel modules. The storing of the memory location may be referred to as logging the memory location. As an example, the memory location may include an address of the memory page that stores the exit function and an offset within the memory page that identifies the entry point into the exit function.

At action 208, a kernel protection feature is activated to lock the module. The kernel that includes the activated kernel protection feature may be referred to as a protected kernel environment. In some examples, the kernel protection feature is activated by the kernel executing a hypercall that requests that the hypervisor activate the kernel protection feature. The kernel protection feature may perform operations such as locking access permissions corresponding to particular memory locations, such that the access permissions may not be modified by the kernel. In some examples, the locking is performed by setting a flag and/or other data structure corresponding to the memory locations to indicate that the memory locations are locked. In some examples, the flag may be a bit in page tables, such as Extended Page Tables (EPT). In other examples, the flag or other data structure may be read by the hypervisor during processing of instructions executed by the kernel so that the hypervisor may determine whether or not access permissions are allowed to be modified.

In the present example, the locking of the module by the kernel protection feature prevents execution of the exit function of the module by the kernel itself and/or any tasks that are managed by the kernel. For example, the kernel, operating system running on top of the kernel, and/or other applications that are assigned tasks that are managed by the kernel are prevented by the kernel protection feature from executing the exit function of the module. In some examples, kernel protection feature also prevents the exit function of the module and/or other portions of the kernel from being written to. For example, the kernel protection feature may prevent writes operations from modifying (1) memory pages that are allocated to the kernel and/or (2) page mappings (such as page table entries) that correspond to the memory pages that are allocated to the kernel.

In some examples, the kernel sets the access permissions corresponding to the memory page that stores the exit function to read-only (e.g., non-executable and non-writable). After the kernel sets the access permissions of the memory page to read-only, the hypervisor activates the kernel protection feature to lock the access permissions, such that they may not be modified by the kernel and/or other applications running on top of the kernel.

In other examples, a kernel protection feature may include one or more other kernel protection features similar to and/or different than the kernel protection feature discussed above.

Figure 3:
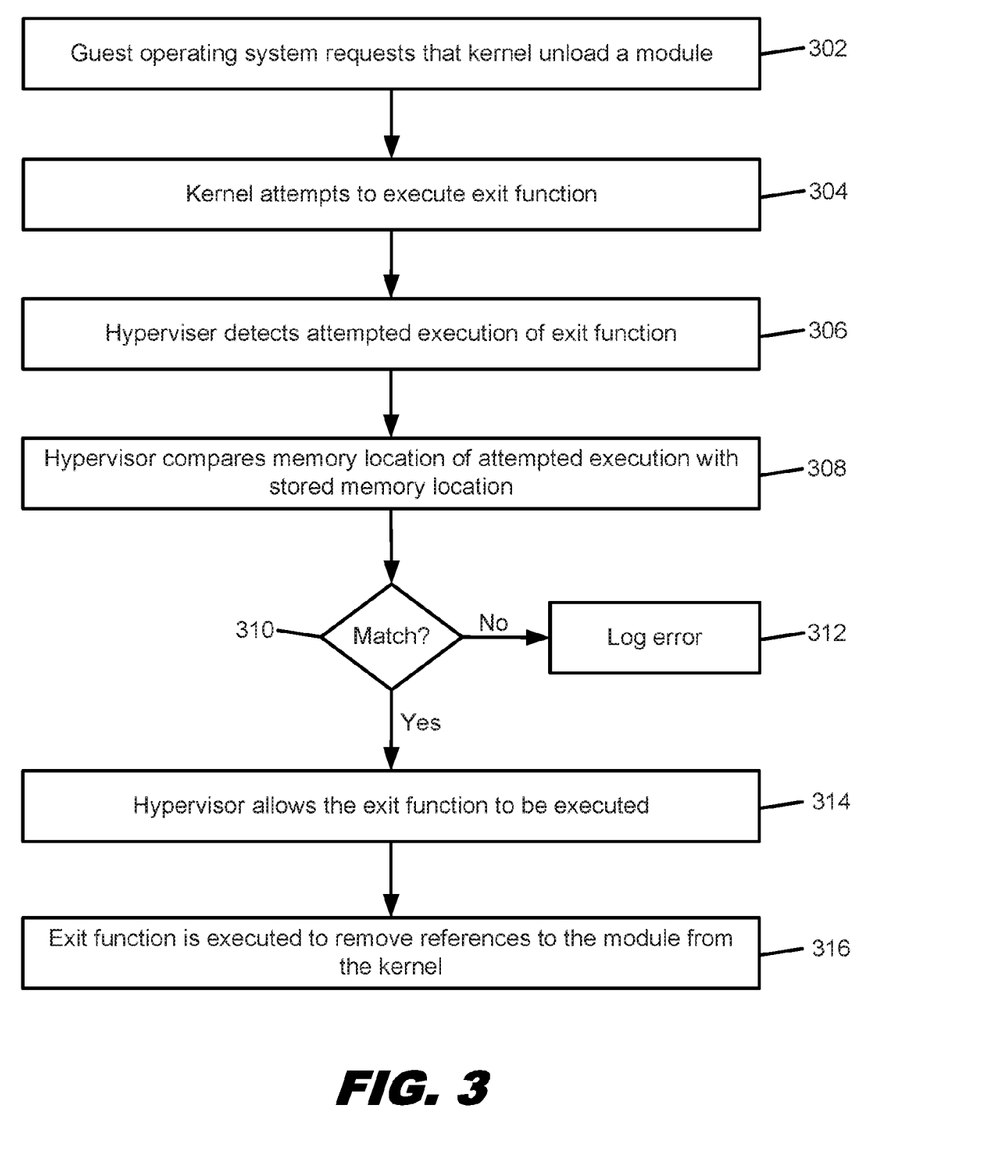
FIG. 3 is a flow diagram illustrating unloading of a kernel module in a protected kernel environment, in accordance with various examples of the present disclosure.

FIG. 3 is a flow diagram illustrating a method for unloading a kernel module in a protected kernel environment, in accordance with various examples of the present disclosure. The method may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method is performed by the system 100 illustrated in FIG. 1. For example, the method may be performed on the host machine 102. In some examples, the order of the actions described below may also be performed according to alternative orderings. In yet other examples, additional actions may be added and actions that are described may be removed.

At action 302, a guest operating system requests that the kernel unload a module. In the present example, a user of the guest operating system may select an option provided by the guest operating system to remove the module. A user may want to remove a module, for example, if a device corresponding to a device driver module is removed from the host machine. In another example, it may be desirable for a user to remove a module so that an updated module may be loaded that includes bug fixes and/or other improvements. Accordingly, the user may trigger the unloading of the module by selecting or entering a command via a user interface. Once the command is entered at the user interface, the guest operating system may provide a system call that communicates to the kernel one or more parameters corresponding to the particular module that is to be unloaded.

At action 304, responsive to the communication from the guest operating system (e.g., a system call), the kernel attempts to execute one or more instructions of the exit function of the module. In the present example, the kernel attempts to execute an instruction located at a particular offset of a memory page that includes the exit function. The offset may identify an entry point for the kernel to begin executing instructions corresponding to the exit function. The offset may be at the start of the memory page (e.g., offset 0) or at another location in the memory page.

However, because the kernel protection feature prevents execution of the exit function instructions, the attempted execution of the instructions results in an error, such as a page fault. In the present example, the error includes information corresponding to the error, such as a memory location corresponding to the one or more instructions. In some examples, the location may be specified as one or more memory addresses corresponding to a memory page that stores the one or more instructions, as well as an offset within the page for a particular instruction that the kernel attempted to execute on the memory page.

At action 306, a hypervisor detects the attempted execution of the one or more instructions corresponding to the exit function of the module. In the present example, the error triggers an error handler at the hypervisor, which executes instructions to respond to the error. For example, the attempted execution of the one or more instructions may trigger a page fault, based on the one or more instructions being non-executable (due to the kernel protection feature). The page fault may cause an exception to be generated by the processor. In some examples, the hypervisor may include a handler that listens for the exception and identifies the exception sent from the processor in order to perform operations responsive to the exception. In the present example, the processor finds the handler for the exception through an Interrupt Descriptor Table (IDT). In other examples, responsive to a page fault, the processor switches execution from the guest to the hypervisor through a Virtual Machine Exit (VMEXIT). Accordingly, the hypervisor detects the attempted execution of the exit function to the kernel and performs actions responsive to the detection.

In the present example, a memory location corresponding to the instruction that the kernel attempted to execute is received by the hypervisor for processing by the error handler. For example, an interrupt or other communication received by the hypervisor corresponding to the attempted execution may include or reference information that provides the memory location.

At action 308, responsive to the detected attempted execution, the hypervisor compares the memory location corresponding to the attempted execution with one or more stored memory locations. For example, the particular memory addresses that the kernel attempted to execute may be compared by the hypervisor with one or more memory addresses logged by the kernel and provided to the hypervisor at action 206. In some examples, the one or more memory addresses may be structured in a list or other data structure and compared with the memory addresses corresponding to the attempted execution one at a time, sequentially.

At action 310, if the memory location corresponding to the attempted execution matches a stored memory location, action 314 is triggered responsive to detecting the match. Otherwise, action 312 is triggered responsive to detecting a failure to match the memory location corresponding to the attempted execution with a stored memory location. In some examples, the matching may be referred to as validating the memory location.

At action 312, the hypervisor logs an error corresponding to the attempted execution. After logging the error, the hypervisor may return execution to the kernel, which may trigger an error message that is provided to a user.

At action 314, the hypervisor allows the exit function to be executed. In some examples, allowing the exit function to be executed may include disabling the kernel protection feature (at least temporarily). In other examples, the kernel protection feature may be maintained, but bypassed by the hypervisor.

In some examples, the hypervisor allows the exit function to be executed by unlocking one or more access permissions corresponding to the module, such that the hypervisor or kernel may modify the access permissions to include execute access for the one or more instructions included in the exit function of the module. In some examples, the unlocking is performed by setting a flag and/or other data structure corresponding to the memory locations to indicate that the memory locations are unlocked. In some examples, the flag may be a bit in page tables, such as Extended Page Tables (EPT). In other examples the flag or other data structure may be read by the hypervisor during processing of instructions executed by the kernel so that the hypervisor may determine whether or not access permissions are allowed to be modified, and perform the appropriate access permission modifications to provide execute access to the instructions.

In some examples, the kernel or the hypervisor also sets one or more portions of the kernel to include write access permissions. For example, during the execution of the exit function, or after execution of the access function, the memory pages that store the module may be modified to provide the kernel with write access permissions to one or more memory pages corresponding to the module, such that the kernel may re-allocate the memory pages for storing other code and/or data.

At action 316, the kernel executes the one or more instructions of the exit function to remove references in the kernel to the module. For example, references to the module may be removed from data structures of the kernel. In some examples, removing references to the module includes removing pointers to the memory addresses of the module from one or more interrupt vectors that are included in the kernel. In other examples, other references to the module may also be removed to perform clean-up activities corresponding to the module, such that the module may be removed from memory without the kernel attempting to access the removed module.

Once the clean-up operations have been performed by executing the exit function, the memory allocated to the module may be re-allocated by the kernel and other code and/or data may be written to the memory. Accordingly, the module is unloaded from the memory.

Figure 4:
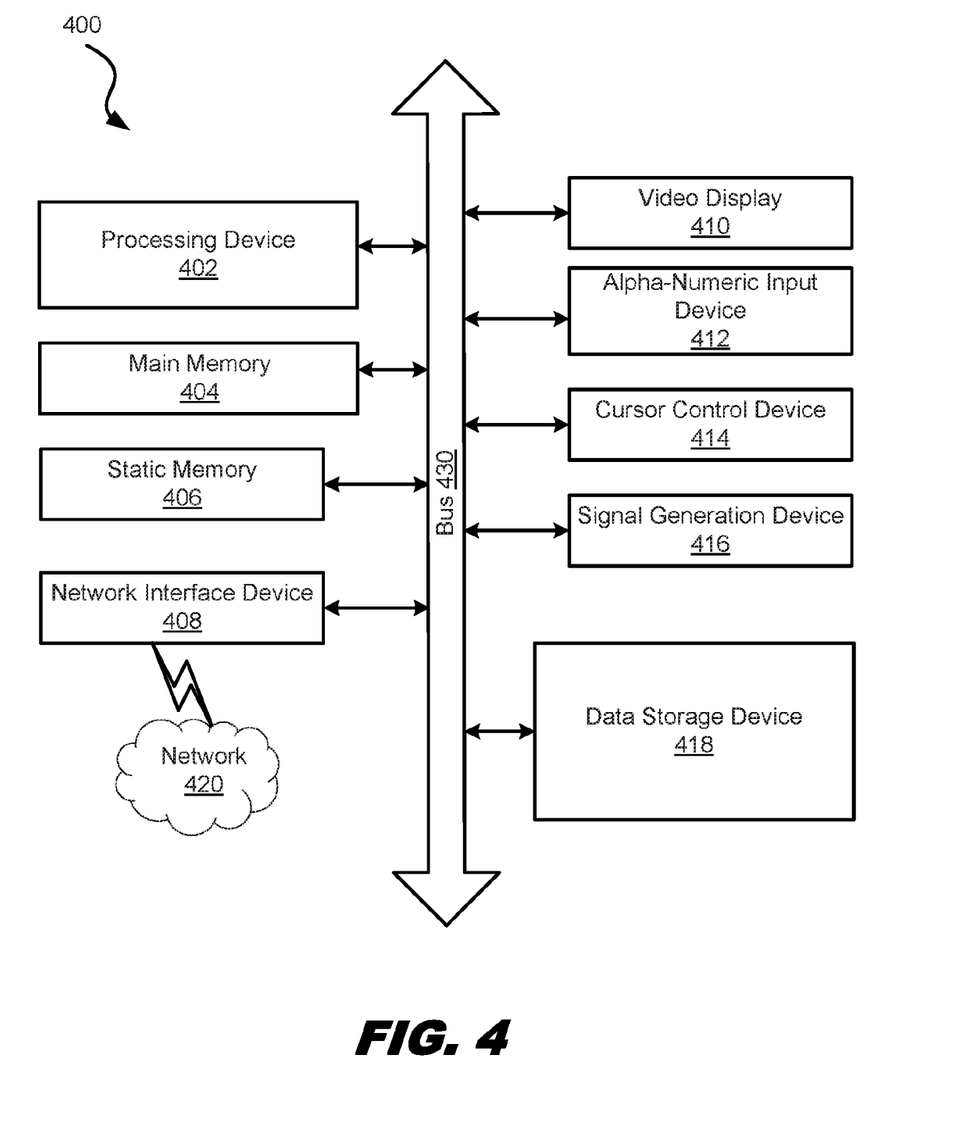
FIG. 4 is an organizational diagram illustrating a computing system suitable for implementing one or more examples of the present disclosure, in accordance with various examples of the present disclosure.

FIG. 4 is an organizational diagram illustrating a computing system 400 suitable for implementing one or more examples of the present disclosure. In the computer system 400, a set of instructions may be executed to perform any one or more of the methodologies discussed herein. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may be used to implement one or more embodiments of the present disclosure. For example, with respect to FIG. 1, the computer system 400 may provide host hardware 104 that executes computer-readable instructions to provide a hypervisor 110, virtual machine 112, and virtual machine(s) 120.

Computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), and so forth), static memory 406 (e.g., flash memory, static random access memory (SRAM), and so forth), and data storage device 418, which communicate with each other via bus 430.

Processor 402 represents one or more general-purpose processing devices such as a microprocessor, central processing unit, or the like. More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408 that is structured to transmit data to and from the network 420.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

The network 420 may include any combination of public and/or private networks. The network 420 may include one or more network devices and transport media that are communicatively coupled via transport media. For example, network devices may include routers, hubs, switches, and so forth. Transport media may include, for example, Ethernet cable, Fibre Channel Cable, wireless signals, and so forth.

While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "transmitting," "comparing," "matching," "ordering," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for performing module unloading in a protected kernel environment, the method comprising:
    loading a module into a kernel, the module including an exit function;
    providing, to a hypervisor, a memory location corresponding to the exit function of the module;
    activating a protection feature corresponding to the kernel;
    after activating the protection feature, detecting an attempt to execute the exit function;
    determining, by the hypervisor, that the attempt to execute the exit function corresponds to the memory location provided to the hypervisor; and
    based on the determining, allowing execution of the exit function.

2. The method of claim 1, wherein the module comprises a device driver.

3. The method of claim 1, wherein loading the module further comprises:
    storing the exit function on a separate memory page from a remaining portion of the module, wherein the remaining portion of the module includes all instructions of the module that are not included in the exit function.

4. The method of claim 1, wherein the memory location comprises an address of a memory page that includes the exit function,
    wherein the memory location further comprises an offset within the memory page, and
    wherein the offset identifies an entry point of the exit function within the memory page.

5. The method of claim 1, wherein providing the memory location is triggered by loading the module or activating the protection feature.

6. The method of claim 1, wherein activating the protection feature comprises:
    modifying an access permission to remove execute access corresponding to the exit function; and
    locking, by the hypervisor, the access permission.

7. The method of claim 1, wherein the protection feature prevents the kernel from writing to one or more memory locations corresponding to the module.

8. The method of claim 1, wherein detecting the attempt to execute the exit function comprises:
    requesting, via a system call, that the kernel unload the module;
    attempting, by the kernel, to execute the exit function;
    triggering a page fault, based on the exit function being non-executable;
    sending, from a processor, an exception corresponding to the page fault;
    listening, by a handler provided by the hypervisor, for the exception; and
    performing one or more operations, by the handler, responsive to the exception.

9. The method of claim 1, wherein allowing execution of the exit function comprises:
    unlocking, by the hypervisor, the access permission to allow the access permission to be modified; and
    modifying the access permission to include execute access.

10. The method of claim 9, wherein allowing execution of the exit function further comprises:
    allowing the kernel to write to one or more memory locations corresponding to the module.

11. The method of claim 1, wherein the exit function comprises one or more instructions that are executed to remove one or more pointers to the module from one or more interrupt vectors provided by the kernel.

12. The method of claim 1, wherein detecting the attempt to execute the exit function comprises:
    requesting, via a system call, that the kernel unload the module;
    attempting, by the kernel, to execute the exit function;
    triggering a page fault, based on the exit function being non-executable;
    sending, from a processor, a virtual machine exit corresponding to the page fault; and
    performing, by the hypervisor, one or more operations responsive to the virtual machine exit.

13. A non-transitory machine-readable medium having stored thereon machine-readable instructions executable to cause a machine to perform operations comprising:
    providing, to a hypervisor, a memory location corresponding to an exit function of a module of a kernel;
    activating a protection feature corresponding to the kernel;
    after activating the protection feature, detecting an attempt to execute at least one instruction included in the exit function;
    determining, by the hypervisor, that the attempt to execute the at least one instruction included in the exit function corresponds to the memory location provided to the hypervisor; and
    based on the determining, allowing execution of the at least one instruction included in the exit function.

14. The non-transitory machine-readable medium of claim 13, wherein the module comprises a device driver.

15. The non-transitory machine-readable medium of claim 13, wherein loading the module further comprises:
    storing the exit function on a separate memory page from a remaining portion of the module, wherein the remaining portion of the module includes all instructions of the module that are not included in the exit function.

16. The non-transitory machine-readable medium of claim 13, wherein activating the protection feature comprises:
modifying an access permission corresponding to the exit function to remove execute access; and
locking, by the hypervisor, the access permission.

17. The non-transitory machine-readable medium of claim 13, wherein allowing execution of the exit function comprises:
unlocking, by the hypervisor, the access permission to allow the access permission to be modified; and
modifying the access permission to include execute access.

18. A system comprising:
a kernel that is provided by a hypervisor;
a module that is loaded by the kernel, the module including an exit function;
a protection feature that is activated to lock an access permission corresponding to the exit function; and
one or more processors that execute instructions provided by the hypervisor to:
detect an attempt to execute the exit function; and
based on the detecting, unlock the access permission and modify the access permission to include execute access.

19. The system of claim 18, wherein the exit function is loaded on a separate memory page from a remaining portion of the module, and wherein the remaining portion of the module includes all instructions of the module that are not included in the exit function.

20. The system of claim 18, wherein the exit function comprises one or more instructions that are executed to remove one or more pointers to the module from one or more data structures provided by the kernel.

* * * * *